(12) United States Patent
Gowda et al.

(10) Patent No.: US 6,344,877 B1
(45) Date of Patent: *Feb. 5, 2002

(54) IMAGE SENSOR WITH DUMMY PIXEL OR DUMMY PIXEL ARRAY

(75) Inventors: Sudhir Muniswamy Gowda, Ossining, NY (US); Hyun Jong Shin, Ridgefield, CT (US); Hon-Sum Philip Wong, Chappaqua, NY (US); Peter Hong Xiao, San Jose, CA (US); Jungwook Yang, West Nyack, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,539

(22) Filed: Jun. 12, 1997

(51) Int. Cl.[7] .......................... H04N 9/64; H04N 5/335; H01L 27/00
(52) U.S. Cl. ...................... 348/245; 348/308; 250/208.1
(58) Field of Search ................................ 348/241, 243, 348/245, 248, 251, 300, 301, 302, 307, 308; 378/98.2; 257/291, 292; 250/208.1

(56) References Cited

U.S. PATENT DOCUMENTS

| 3,516,085 A | * | 6/1970 | Dano ......................... 340/347 |
|---|---|---|---|
| 4,158,809 A | * | 6/1979 | Dellamano ................. 324/99 D |
| 4,300,163 A | * | 11/1981 | Wada et al. ................. 348/616 |
| 4,807,038 A | * | 2/1989 | Michon ....................... 348/306 |
| 4,839,729 A | * | 6/1989 | Ando et al. .................. 348/241 |
| 5,105,276 A | * | 4/1992 | Schrock ...................... 348/241 |
| 5,717,457 A | * | 2/1998 | Motimoto .................... 348/241 |
| 5,724,094 A | * | 3/1998 | Tseng et al. ................. 348/243 |
| 5,742,047 A | * | 4/1998 | Buhler et al. ........... 250/214 R |
| 5,818,898 A | * | 10/1998 | Tsukamoto et al. ........ 378/98.8 |

OTHER PUBLICATIONS

Garverick et al., "A 32–Channel Charge Readout IC for Programmable, nonlinear Quantization of Multichannel Detector data", IEEE Journal of Solid–State Circuits, vol. 30, No. 5, May. 1995.*

Kyomasu, "A New MOS IMager Using Photodiode as Current Source", IEEE Journal of Soild–State Circuits, vol. 26, No. 8, Aug. 1991.*

* cited by examiner

*Primary Examiner*—Andrew B. Christensen
(74) *Attorney, Agent, or Firm*—F. Chau & Associates, LLP

(57) ABSTRACT

Disclosed is an image sensor including one or more dummy pixels that produce a reference signal which is used to compensate for errors within the devices of the main pixel cells. In one embodiment, at least one dummy pixel is used in conjunction with other circuitry to correct for nonlinearities in the transfer characteristic of a source follower transistor within each pixel. In another embodiment, an array of dummy pixels is used to correct for leakage current within the pixels during an electronic shutter mode of operation. The two techniques can be combined whereby both threshold voltage mismatch and leakage current are compensated for.

11 Claims, 13 Drawing Sheets

IMAGE SENSOR WITH DUMMY PIXEL OR DUMMY PIXEL ARRAY

CROSS REFERENCE TO RELATED APPLICATIONS

This application is related to the following copending U.S. patent applications and patents; U.S. Pat. No. 5,898, 168, entitled IMAGE SENSOR PIXEL CIRCUIT; Ser. No. 08/876,694, entitled IMAGE SENSOR WITH DIRECT DIGITAL CORRELATED DOUBLE SAMPLING; and U.S. Pat. No. 5,877,715, entitled CORRELATED DOUBLE SAMPLING WITH UP/DOWN COUNTER, all of which are by the same inventors as this application, filed on the same day as this application, assigned to the assignee herein and expressly incorporated herein by reference.

FIELD OF THE INVENTION

This invention relates generally to image sensors. More specifically, the present invention relates to a complementary metal oxide semiconductor (CMOS) image sensor with a dummy pixel or dummy pixel array to enhance image data accuracy.

BACKGROUND

CMOS imager sensors are becoming more competitive to charge coupled device (CCD) imagers in terms of low cost and easy fabrication with current CMOS processes. These image sensors may be used as the input device in a wide variety of camera systems. One advantage of CMOS image sensors (or imagers) is that signal processing circuits can be readily integrated on the same chip as the imager, thus enabling the design of smart, single-chip camera systems. CMOS imagers are contemplated for use with computers and communication devices to realize low cost videoconferencing. Other applications include robotics, machine vision and automotive electronics. CMOS imager cells (or pixels) store light information as a photocharge on a photodiode or photogate, and then an electrical signal corresponding to the photocharge is read out through a bit line, typically a column data line. Unlike DRAM cells carrying digital data, the imager cell should carry a high resolution analog signal for subsequent conversion to a digital code as high as an 8-bit or 10-bit code with today's technology. The bit lines have a large capacitance as compared to that of the storage device in the cell. Consequently, the storage cells are usually active cells, which means that the output signal of the cells are amplified or buffered to the bit-line in order to be unaffected by the bit-line capacitance. However, non-linearities in the amplification or buffering leads to errors in the image data.

FIG. 1 schematically illustrates one example of prior art active-pixel CMOS imager circuitry. Imager 10 is an image sensor as disclosed in an article by Mendis et al., entitled "A 128×128 CMOS Active Pixel Image Sensor for Highly Integrated Imaging Systems", IEEE Electron Devices Meeting, p. 583, 1993. A MOS photogate 6 is employed as the light sensitive element in each pixel (imager cell) 18. The transistors within each pixel 18 are typically NMOSFETS. The overall imager 10 is considered a CMOS imager since CMOS electronics are used in conjunction with the imager cells. For example, the transistors 3 within readout circuit 31 are typically PMOSFETS. Imager cells 18 are arranged in rows and columns to form an array, with typically only one row being activated for image data readout at any time. Within each cell 18 photo-charge "q" collected under photogate transistor 6 is transferred through a dc-biased transfer gate transistor 8 to a floating diffusion diode 7 formed beneath substrate surface 9. This floating diode 7 is periodically dc-restored by the application of a logic high RESET pulse on the RES bus to the gate of reset FET 11, thus resetting the potential of diode 7 (i.e., at circuit node 17) to the power supply voltage (VDD). Following each diode reset cycle, the photo-charge is transferred to floating diode 7. The voltage on diode 7 then corresponds to the intensity of light incident upon the associated imager cell 18. This voltage sets the potential of the gate of source follower FET 13, which amplifies or buffers the voltage appearing at its gate terminal for subsequent readout. When row select transistor 12 is turned ON by a VROW pulse on row select line RSL, the voltage at circuit node 17 is detected by readout circuit 31 detecting corresponding voltage on column bus 15.

To remove reset noise of reset switch 11, a correlated double sampling (CDS) operation is performed. This involves subtracting the reset level measured on column bus 15 from the signal level on the column bus, where the reset level is obtained just prior to the transfer of photo-charge to diode 7. As such, any offset errors due to transistor mismatches are canceled since both levels are measured at the same circuit point. In the embodiment of Mendis et al., the reset level and the signal level are stored on two separate sample and hold capacitors CR and CS, via two separate switches S1 and S2, respectively. Two identical readout circuit portions are required, one for the reset level, and one for the signal level. Further differential amplification at the multiplexed column output is required to complete the reset noise removal operation.

As mentioned above, the source follower FET 13 amplifies or buffers the voltage level on circuit node 17 such that the image data will be unperturbed by the column data bus capacitance. A problem with this approach is that the source follower is non-ideal, such that the transfer characteristic between the pixel voltage at node 17 and the output voltage on column bus 15 is non-linear. This non-linearity stems from the relationship between threshold voltage and gate voltage. If the source follower is an NMOS fabricated by conventional CMOS processes, the backgate is typically not tied to the source, resulting in a threshold voltage that changes with input (gate) voltage. The larger the source voltage is relative to the substrate voltage, the larger is the threshold voltage, leading to the nonlinear characteristic. Thus, a higher gate voltage produces a higher threshold voltage, resulting in an output signal that is attenuated relative to the ideal case. A similar nonlinearity occurs if the source follower is a PMOS. In either case, the nonlinear transfer characteristic produces a conversion error from the light source to the output image data.

Electronic shuttering capability can be incorporated within CMOS image sensors by the addition of a shutter transistor within each pixel. When this shutter transistor is pulsed on, the photocharge stored by the photosensitive element is transferred to a storage node within the pixel. The storage charge is then read out sequentially row by row. A problem with this approach, however, is that leakage current at the storage node can severely degrade the signal integrity thereat. As the number of pixels grows to realize high resolution pictures, the time required to scan all the pixels also grows. Hence, the total amount of charge lost by leakage becomes significant, thereby degrading the overall picture quality. In addition, since the charge is read sequentially row by row, the lost charge in the pixels are all different according to their row order. One common solution to this problem is to reduce the leakage current; however, leakage current reduction is difficult to implement. It usually involves expensive manufacturing equipment to minimize leakage current at the p-n junction (source or drain to substrate) of the shutter transistor.

Accordingly, there is a need to overcome the deficiencies of image quality degradation due to threshold voltage variation in CMOS image sensors, and due to leakage current in image sensors with electronic shuttering.

SUMMARY OF THE INVENTION

The present invention relates to an image sensor including one or more dummy pixels that produce a reference signal which is used to compensate for errors within the devices of the main pixel cells. In a first embodiment, at least one dummy pixel is used in conjunction with other circuitry to correct for nonlinearities in the transfer characteristic of a source follower transistor within each pixel. The dummy pixel may be used in conjunction with A/D converters connected directly to column data lines of the main pixel array. A plurality of comparators and up/down counters may be used to perform directed correlated double sampling with threshold voltage compensation. In a second embodiment, an array of dummy pixels is used to correct for leakage current within the pixels which is present during an electronic shutter mode of operation. The dummy pixel array may be used in conjunction with a dummy pixel compensating for threshold voltage variation, whereby errors due to both leakage current and threshold voltage mismatch are corrected.

BRIEF DESCRIPTION OF THE DRAWINGS

Preferred embodiments of the present invention are described herein with reference to the drawings, in which like reference numerals identify similar or identical components throughout the several figures, wherein.

DETAILED DESCRIPTION OF THE PREFERRED EMBODIMENTS

Figure 2:
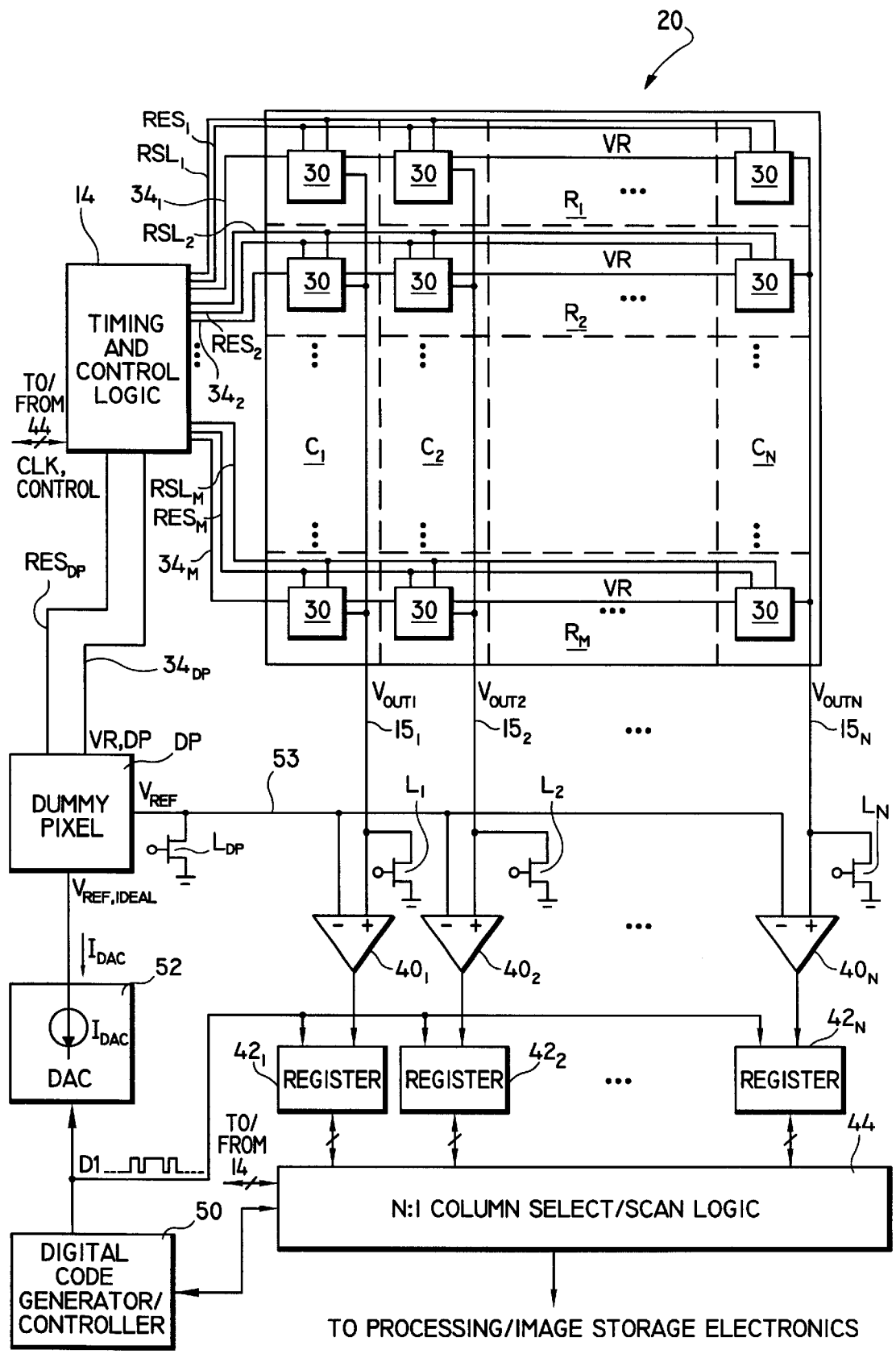
FIG. 2 is a schematic block diagram of a first embodiment of an image sensor in accordance with the present invention.

FIG. 2 schematically illustrates an exemplary embodiment of an image sensing device in accordance with the present invention, designated as 20. This embodiment employs a single dummy pixel DP in conjunction with other circuitry to compensate for a nonlinear transfer characteristic of a source follower transistor within each imager cell, thus improving image data quality. Device 20 includes a plurality of imager cells (pixels) 30 arranged in M rows $R_1$ to $R_M$ by N columns $C_1$ to $C_N$. Several differences are apparent between image sensor 20 and the prior art image sensor discussed above. The prior art analog readout circuits 31 at the bottom of each column have been eliminated and replaced by a set of comparators $40_1$–$40_N$ and registers $42_1$–$42_N$. These comparators and registers operate to provide a direct analog to digital conversion function in conjunction with a digital code generator/controller 50, a digital to analog converter (DAC) 52 and dummy pixel DP. Dummy pixel DP is included to substantially reduce image data errors due to the nonlinearity of the source followers within each imager cell 30, as will be explained below. The overall circuit arrangement of sensor 20 advantageously eliminates the prior art analog readout circuits, which are susceptible to noise and gain errors that reduce the accuracy of the image data. In addition, the prior art capacitor CR used to store the reset sample must have a large area to minimize noise. Image sensor 20 excludes these large capacitors CR, as well as the signal capacitors CS, providing room for other electronics and/or reducing the overall chip size.

In operation, timing and control circuit 14 activates one row at a time for image data readout. Typically, the image data from all imager cells 30 in the activated row Ri are read out simultaneously on the column data lines $15_1$–$15_N$. The rows are selectively activated by proper application of ROW SELECT signals on lines $RSL_1$–$RSL_N$, signals on lines $RES_1$–$RES_M$, and supply voltage pulses $V_R$ on lines $34_1$–$34_M$. During each row activation time interval, digital code generator/controller 50 (hereafter, controller 50) generates a ramped digital output code D1 representing an ideal reference voltage $V_{REF,IDEAL}$. The digital output code, which may be an 8-bit or 10-bit code, for example, is applied to DAC 52 and to all registers $42_1$–$42_N$. DAC 52 draws current $I_{DAC}$ at a current level in accordance with digital code D1. The output current line of DAC 52 connects directly to a reference circuit node within dummy pixel DP, such that the potential of that reference node is set to the ideal reference voltage $V_{REF,IDEAL}$. This voltage is applied to the input of a source follower FET within the dummy pixel whose size and characteristics are the same as in each pixel 30. As a result, dummy pixel DP produces a nonlinear output voltage $V_{REF}$ on line 53, which is applied to the inverting terminals of each comparator $40_1$–$40_N$. Column data lines $15_1$–$15_N$ connect to the noninverting terminals of comparators $40_1$–$40_N$, respectively, whereby each comparator such as 40i compares the corresponding image data output signal $V_{OUTi}$ with $V_{REF}$. When the output logic of comparator 40i flips state, indicating that $V_{OUTi}$ is about equal to $V_{REF}$ at that instant in time, the comparator output logic enables the associated register $42_i$, whereby the digital value of D1 at that instant of time is latched in register $42_i$. The register then transfers the stored digital code representing the image data of the activated pixel 30 to a register within N:1 column select/scan logic block 44 for subsequent processing.

Figure 1:
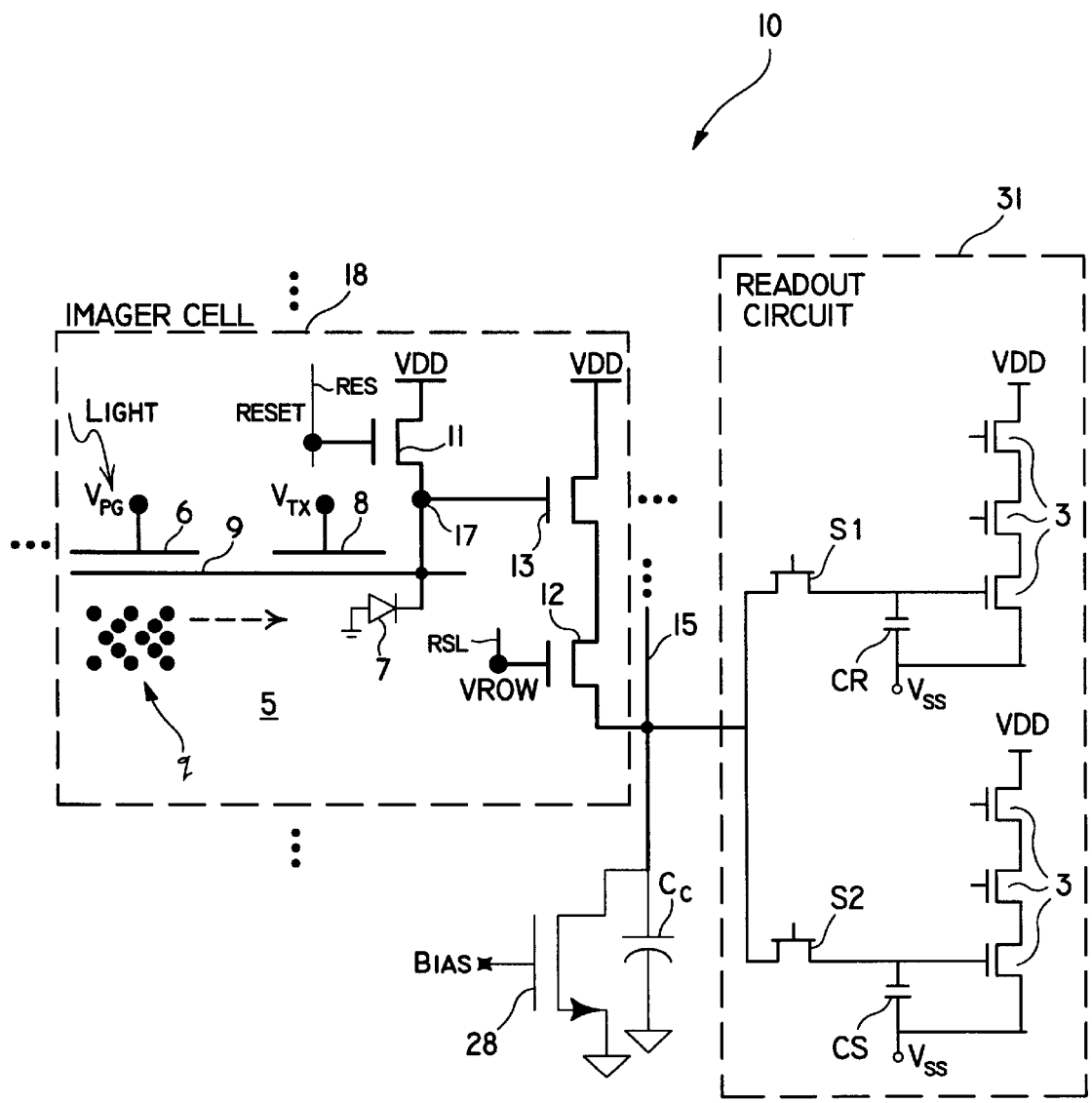
FIG. 1 schematically illustrates a prior art image sensor and pixel circuit.
Figure 3:
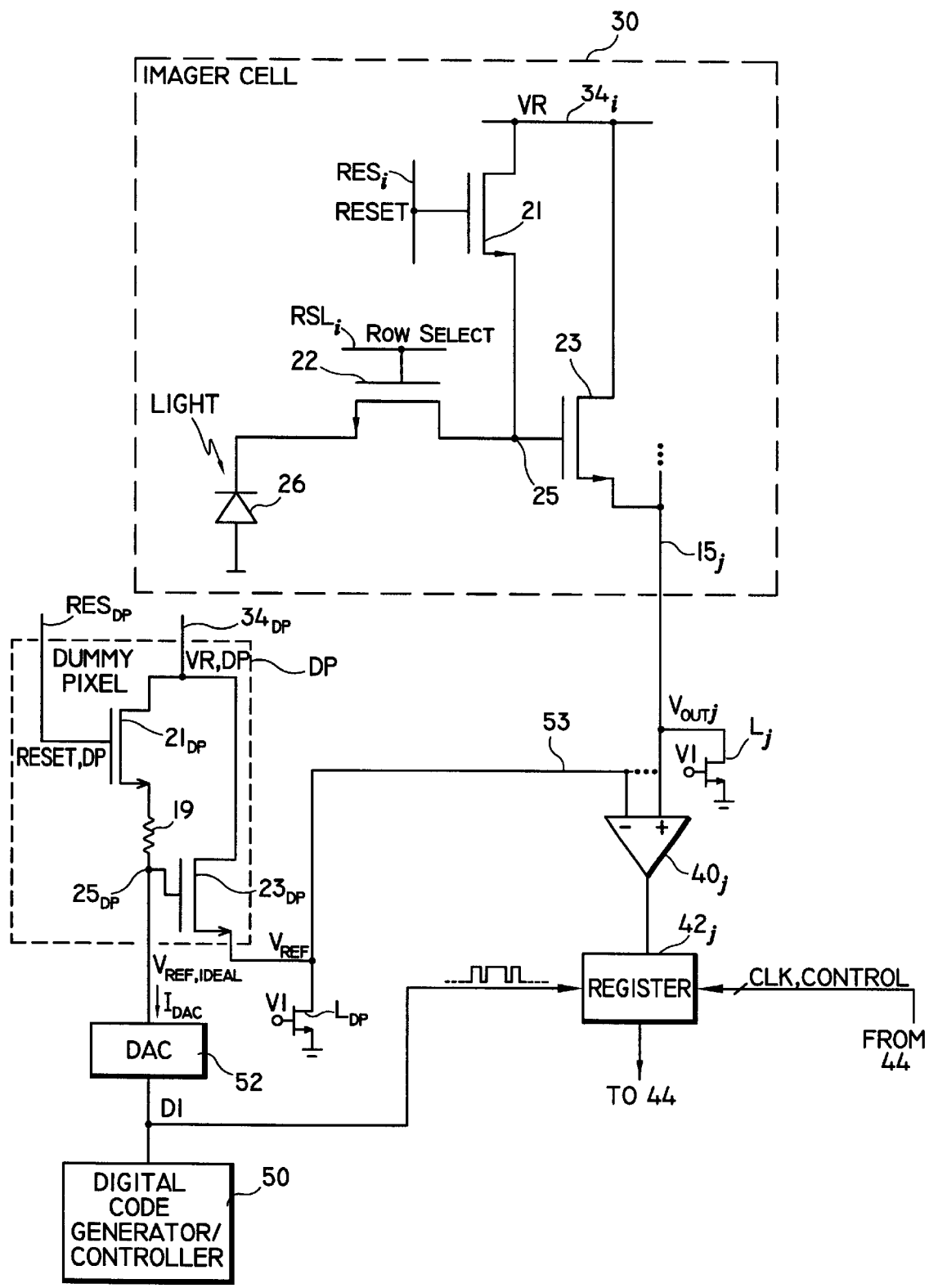
FIG. 3 illustrates an imager cell that may be used in the image sensor of FIG. 2.

With reference now to FIG. 3, there is shown exemplary pixel circuitry for any imager cell 30 in the "ith" row and "jth" column of imager 20. Exemplary circuitry for the dummy pixel DP is also presented. The circuitry within dummy pixel DP is chosen in correspondence with that of cells 30 to enable the voltage transfer characteristics to track that of each cell 30 and thus, to correct for the nonlinearities of the source followers within the cells. Imager cell 30 of FIG. 3 is also disclosed in our commonly assigned, copending U.S. patent application Ser. No. 08/876,694, entitled IMAGE SENSOR PIXEL CIRCUIT, mentioned above (hereafter, the "H. Wong et al. I" application). Imager cell 30 is an improvement over the prior art cell of FIG. 1, in that the large row select MOSFET 12 is eliminated, thereby allowing more space for the photosensitive element, in this case, photodiode 26. In addition, less bus lines are required, which likewise creates more space for the photosensitive element. Only three bus lines—RESET line $RES_i$, VR line $34i$ and Row Select line $RSL_i$—are connected to the imager cells 30 of a common row $R_i$. Hence, imager 20 can exhibit improved resolution over the prior art by utilizing the extra space created in each pixel to provide a larger area for the photosensitive element and/or reduce the overall pixel size.

The pixel circuit of cell 30 eliminates the separate row selection transistor by employing FET 22 to perform both a charge transfer function and a pixel selection function. The row select line $RSL_i$ connects directly to the gate of FET 22. In addition, the pixel selection function is carried out in conjunction with reset transistor 21. As such, reset transistor 21 is functionally different from reset transistor 11 of FIG. 1, which, in the prior art, was used strictly for resetting the photosensitive element. In the prior art, the bus line RES connecting the gate of FET 11 is typically tied to multiple rows, whereby the cells of multiple rows are reset together. In the embodiments disclosed herein, each reset bus $RES_1$–$RES_M$ is dedicated for a single row and is not tied to multiple rows, thereby enabling the reset device 21 to perform a partial pixel selection function as well as a reset function.

FET 21 operates to reset the reference circuit node 25 to nearly the voltage level VR on bus line $34_i$ when the RESET signal on the $RES_i$ bus is pulsed. Specifically, the node 25 voltage is reset to VR–$V_{DS21}$, where $V_{DS21}$ is typically about 0.4–0.5 volts. As will be explained more fully below, following the application of the RESET pulse, the voltage at reference node 25 is indicative of reset noise during a first sampling time interval in which charge transfer device 22 is OFF. During a second sampling interval in which device 22 is ON, the reference node 25 voltage is indicative of photocharge collected by photodiode 26, and hence, the intensity of light incident upon cell 30. The gate of FET 22 is tied to the $RSL_i$ line to receive the ROW SELECT signal. In the prior art, the RSL line is tied to the separate MOSFET 12. With imager cell 30, the relatively small charge transfer FET 22 performs a partial pixel selection function formerly performed by the large MOSFET 11. Source follower FET 23 is used to amplify and buffer the voltage at reference node 25 to transfer an amplified version of the charge to column bus line $15j$. Column load transistor or resistor $L_j$ sinks output current on the column data line. At any given time, only one pixel 30 per column is active, as controlled by both the row select signal and the RES signal. As such, the voltage $V_{OUTj}$ provided on column bus $15j$ to comparator $40j$ is directly related to the voltage on reference node 25 of the active pixel.

Figure 4:
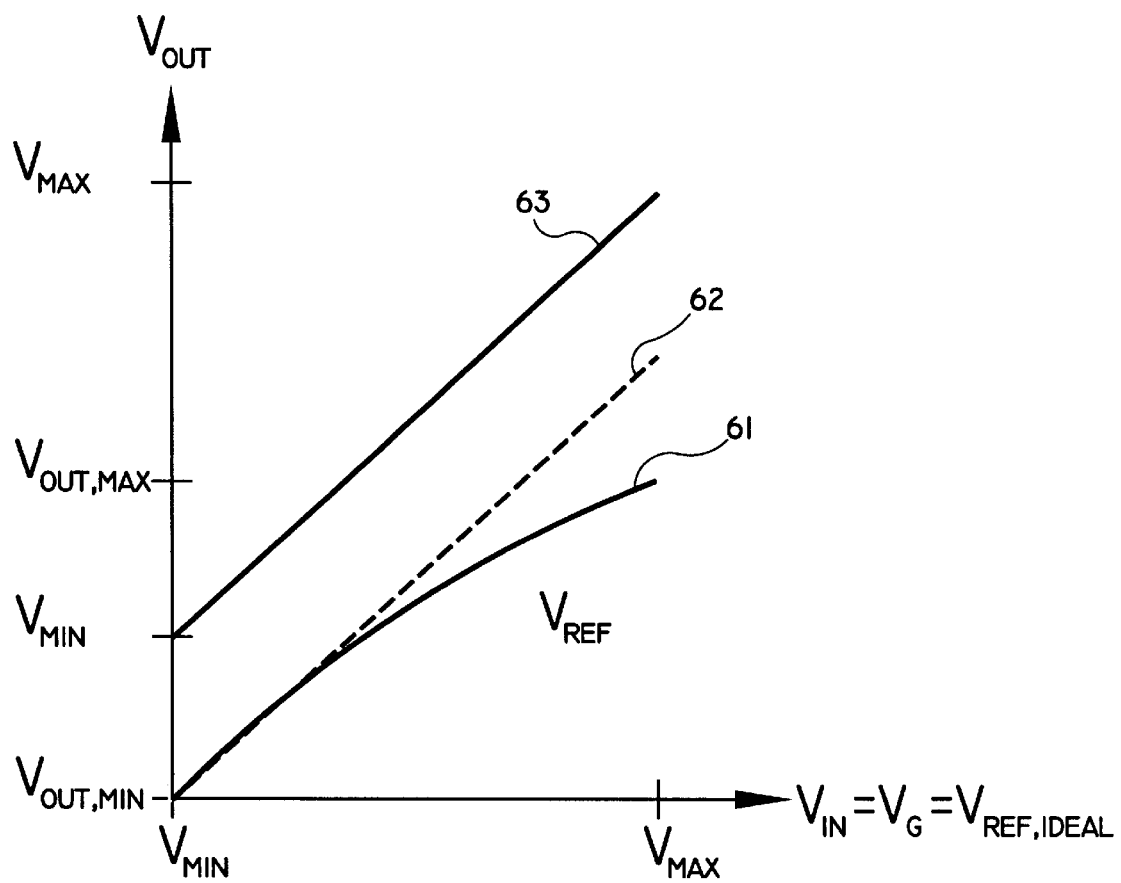
FIG. 4 is a graph showing voltage transfer characteristics of a source follower within a dummy pixel or main pixel.

Dummy pixel DP includes a source follower FET $23_{DP}$ of the same size and characteristics as the source follower FET 23 of the imager cells 30. As discussed above, D/A converter 52 draws current $I_{DAC}$ in accordance with the instantaneous digital word D1 outputted by controller 50. A resistor 19 is coupled between circuit node $25_{DP}$ and FET $21_{DP}$ of generally the same characteristics as FET 21 within each cell 30. The drains of FETS $21_{DP}$ and $23_{DP}$ are tied to the VR supply line $34_{DP}$. A load resistor or transistor $L_{DP}$ of the same resistance as any of column bus loads $L_1$–$L_N$ connects to the source of FET $23_{DP}$ via line 53 to sink current. The output current $I_{DAC}$ forces a voltage drop across resistor 19 to produce the ideal voltage $V_{REF,IDEAL}$ at circuit node $25_{DP}$. Resistor 19 is selected such that, when codeword D1 is ramped between a minimum and maximum value during each row activation time interval, the range of voltage levels of $V_{REF,IDEAL}$ at node 25 will correspond to at least the maximum expected range within each imager cell 30. As a result, the output voltage $V_{REF}$ will be essentially the same as voltage $V_{OUTj}$ on column bus $15j$ when active pixel $30j$ has the same circuit node 25 voltage. It is noted that FET $21_{DP}$ is used to make the condition of the dummy pixel similar to that of the pixel 30. A RESET, DP voltage on line $RES_{DP}$ and a VR, DP voltage on line $35_{DP}$, both originating from timing and control logic 14, are both set high during each readout interval. As such, FET $21_{DP}$ is always ON and the voltage at node $25_{DP}$ can be properly varied by varying $I_{DAC}$. FIG. 4 illustrates voltage transfer characteristics between the absolute gate voltage $V_G$ (voltage at circuit node 25 or $25_{DP}$) and the source voltage of source follower FET 23, i.e., $V_{OUTj}$ or $V_{REF}$, for several conditions. The range of $V_G$ is from $V_{MIN}$ to $V_{MAX}$ which is the selected range of $V_{REF,IDEAL}$ during image sensor operation. Curve 63 would be the output if $V_{OUT}$ perfectly tracked $V_{IN}$, i.e., if the threshold voltage $V_T$ of FET 23 were always zero. Curve 62 represents an ideal linear output which would result if $V_T$ remained constant with varying $V_G$. Curve 61 illustrates the nonlinear transfer characteristic of a typical source follower FET with a back gate effect. Without dummy pixel DP to compensate for the nonlinearity, the image data readout for darker light conditions (higher $V_G$) would be an attenuated representation of the actual condition.

Referring again to FIG. 3, during each row activation interval, D1 ramps from a maximum to a minimum, causing $V_{REF,IDEAL}$ to ramp from $V_{MAX}$ to $V_{MIN}$. During this time, when $V_{OUTj}$ is less than $V_{REF}$, comparator $40j$ outputs a logic low to register $42j$, which does not latch the register. As soon as $V_{OUTj}$ exceeds $V_{REF}$, comparator $40j$ outputs a logic high, causing register $42j$ to latch, whereby the last digital code D1 inputted to register $42j$ will be stored. Each register as $42j$ receives clock and control inputs from logic block 44 to control data storage and transfer. Once latched, the contents of register $42j$ are transferred to a register within logic block 44 upon a subsequent command from logic block 44, whereupon register $42j$ is reset for the next data readout.

It is noted that image sensor 20 of FIG. 2 may alternatively utilize other pixel circuit configurations for the imager cells 30 used in conjunction with dummy pixel DP and the other image sensor electronics. The present invention is not limited to an image sensor using the imager cell of FIG. 3. In essence, for image sensors using correlated double sampling to reduce noise, any pixel circuit which allows the separate sampling of the reset and signal samples can be used within the image sensor 20 of the present invention. For example, any of the other pixel circuit configurations disclosed in the H. Wong et al. I patent application cited above may be used. That patent discloses various modifications to the pixel circuit of FIG. 3 herein, such as: employing a phototransistor in place of photodiode 26; including an anti-blooming transistor within each cell; and including a shutter transistor within each cell to perform electronic shuttering. Each of these pixel circuits avoids the use of a separate row select transistor 12 as in FIG. 1—as such, the dummy pixel circuit shown in FIG. 4 can be used for any of these cases. If a separate row transistor is employed, as in the Mendis et al. pixel circuit described above, the dummy pixel can still be used, but should be modified to include an additional transistor following FET 23 which has the same characteristics of row selection transistor 12 in order to more closely simulate the voltage transfer characteristics of the main pixels.

Figure 5:
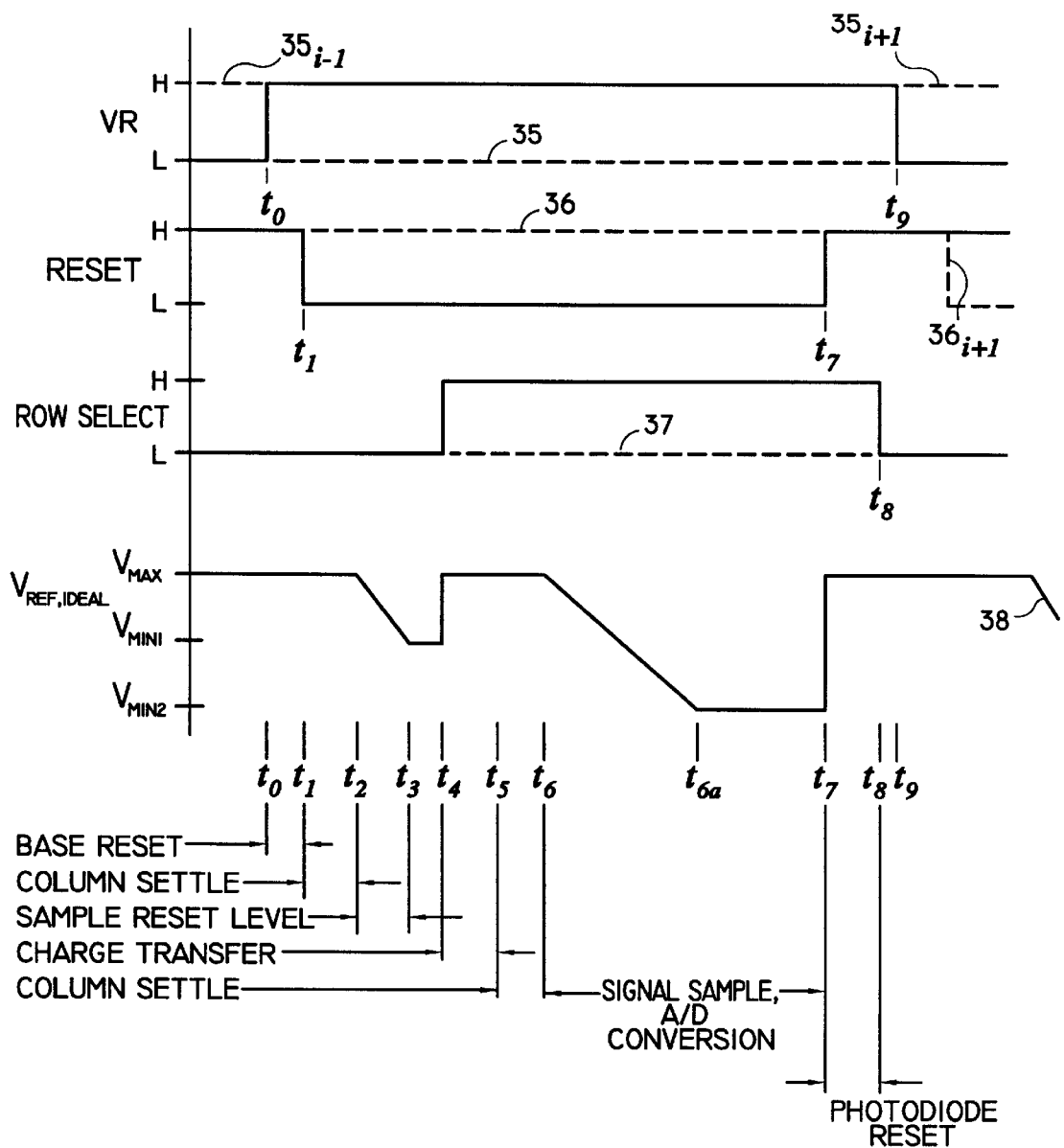
FIGS. 5 and 6 are timing diagrams of waveforms applied to the image sensor cells of FIG. 3.

Operation of image sensor 20 of FIG. 2 (with imager cells 30 of FIG. 3) will now be described in conjunction with the timing diagram of FIG. 5. The solid lines of the VR, RESET and ROW SELECT waveforms in the diagram represent the waveforms applied to the active pixel 30 of column $C_j$. The dotted lines 35–37 represent the respective waveforms applied to inactive pixels 30 in that column (i.e., inactive during the time interval from time $t_0$ to $t_9$). The ensuing discussion pertains to the active pixel. The time prior to time $t_0$ represents a photocharge collection period for all the pixels in a row (e.g., for the "ith" row, $R_i$). In this period, VR is low, RESET is high, and ROW SELECT is low. "High" potential for the various waveforms discussed herein is typically 1.2, 1.8, 2.5, 3.3 or 5 volts; "low" is typically zero volts. Photocharge is collected in the photodiode during the photocharge collection period and the potential of photodiode 26 (i.e., the potential of the cathode well relative to the substrate potential) is lowered corresponding to the amount of photocharge collected. Since ROW SELECT is low, FET 22 is OFF and the photocharge does not get transferred out during this time. Also, RESET is high, turning FET 21 ON, whereby reference node 25 is set at nearly VR, which is low. As such, the gate of FET 23 is low, turning FET 23 OFF, such that no voltage from that pixel is put on column bus $15_j$. Meanwhile, VR is high for the pixels 30 in the preceding row $R_{i-1}$ as indicated by waveform portion $35_{i-1}$, to permit data readout from the pixels in that row.

At time $t_0$, VR applied to the pixels 30 of row $R_i$ is raised to begin a base reset/read period. When VR is high, reference node 25 is set to a high potential since FET 21 is still ON. The RESET signal is then brought low at time $t_1$, e.g., five microseconds after time $t_0$, isolating reference node 25 from the VR bus $34_i$. Due to parasitic gate to source capacitance of the reset FET 21, noise on the RES (clock) line feeds through to reference node 25. As such, this "clock feedthrough" due to RESET going low is also stored in circuit node 25. When RESET is brought low at time $t_1$, the voltage $V_{OUTj}$ on column bus $15_j$ is directly related to the reference node 25 voltage due to the gate to source voltage drop of the source follower FET 23. After an appropriate "column settle" time between $t_1$ and $t_2$, $V_{REF,IDEAL}$ is caused to linearly ramp from a maximum value $V_{MAX}$ to a first minimum value $V_{MIN1}$ by code generator 50 sequentially changing the digital code, i.e., sequentially decreasing the code count. (If DAC 52 operates in an "inverse" mode, an increasing output count from code generator 50 will produce the negatively sloping ramp voltage $V_{REF,IDEAL}$). The voltage range of $V_{MIN1}$ to $V_{MAX}$ is set based on the expected extremes of the voltage range at reference node 25 within the pixels 30 during the reset period. This range is preferably established based on experimental observation of the voltage for typical pixels. It is noted that, in the time prior to $t_2$, the value of $V_{REF,IDEAL}$ is immaterial since no sampling is being performed. As $V_{REF,IDEAL}$ is ramped down between $t_2$ and $t_3$, $V_{OUTj}$ is sampled by means of comparator $40_j$ comparing $V_{REF}$ produced by the dummy pixel to $V_{OUTj}$ and changing its logic output as soon as $V_{OUTj}$ exceeds $V_{REF}$. The latest count of D1 is then latched within register $42_j$ as explained above, and the register contents are transferred to logic block 44 prior to the next sampling interval (i.e., prior to time $t_6$). The transferred codeword corresponds to the reset level value for that pixel for a subsequent correlated double sampling computation to remove the reset noise from the image data by subtracting the reset level from the signal level. The reset level data within all registers $42_1$–$42_N$ may be transferred simultaneously to logic block 44 upon appropriate command. The reset level data accurately corresponds to the reset levels at the reference nodes 25 of the active pixels, due to the compensation for threshold voltage mismatch.

It is noted that sampling is avoided during the column settle interval ($t_1$ to $t_2$) to avoid sampling transient noise associated with the reset FET 21 being rapidly turned off. The column settle interval $t_1$–$t_2$ may be about one microsecond in duration.

During the time interval immediately following time $t_1$, it is important that no voltage is put on the column bus by the pixels in the other rows, which would otherwise diminish accuracy of the reset noise and signal data readout from the active pixels. As such, the VR, RESET and ROW SELECT signals applied to the inactive pixels are low, high and low, respectively, as indicated by respective waveform portions 35, 36 and 37. The source follower FET 23 of the inactive pixels will then be off during this time. As such, the output voltage provided on each column bus $15_1$–$15_N$ corresponds only to the reference node 25 voltage of the active pixel 30 in that column.

A charge transfer interval for the active pixels commences at time $t_4$ by raising the ROW SELECT signal applied to row $R_i$. This turns on the charge transfer FET 22 of the pixels 30 in row $R_i$, thereby allowing the charge collected in photodiode 26 to be shared among the photodiode capacitance and the capacitance at reference node 25 (or to be completely transferred to the reference node capacitance, depending on the photodiode design). The potential of reference node 25 will fall corresponding to the amount of electrons collected in photodiode 26. $V_{OUTj}$ will fall corresponding to the reference node 25 potential. The charge transfer interval is typically on the order of two microseconds. After a second column settle interval between time $t_5$ and $t_6$ (e.g., one microsecond) a signal sampling interval begins during which $V_{REF,IDEAL}$ is ramped down from $V_{MAX}$ at time $t_6$ to $V_{MIN2}$ at time $t_{6a}$. ($V_{REF,IDEAL}$ was previously raised from $V_{MIN1}$ to $V_{MAX}$ sometime between time $t_3$ and $t_6$ via appropriate command from logic block 14 or 44 to code generator 50). The value of $V_{OUTj}$ during this interval is the "signal" value (including noise) corresponding to the node 25 voltage, which corresponds to the amount of light incident upon the active pixel 30. As such, $V_{MIN2}$ is selected to be below the minimum potential of reference node 25 expected during this interval. The minimum potential expected essentially corresponds to the brightest light condition, since the higher the photocharge collected, the lower the voltage at reference node 25. $V_{MIN2}$ is preferably selected based upon experimental observations for the pixel 30 design. As soon as $V_{REF}$ produced by the dummy pixel is below $V_{OUTj}$ during the signal sampling interval, the output of comparator $40_j$ flips logic state, causing register $42_j$ to be latched to the latest count D1 (second codeword). After time $t_{6a}$, the register contents of all registers $42_1$–$42_N$ are transferred to registers within logic block 44. The reset value corresponding to the first codeword is then subtracted from the signal value corresponding to the second codeword to obtain an image datum with the reset noise and threshold voltage mismatch removed. This completes the correlated double sampling operation. The subtraction can be performed for all columns in parallel, in either a bit serial or bit parallel fashion. Alternatively, the subtraction can be performed sequentially. Column select/scan logic 44 outputs the final image data corresponding to each pixel 30 in the array to image storage and processing electronics.

After the signal read interval at time $t_7$, photodiode 26 needs to be reset to a high potential before the next cycle of photocharge collection can begin. This is accomplished by raising the RESET signal at time $t_7$ high, while keeping the ROW SELECT and VR bus signals high. As such, reference node 25 will be high, and the photodiode is reset to a high potential since FET 22 is ON. Following this operation, ROW SELECT is brought low again at time $t_8$ to turn FET 22 OFF and isolate reference node 25 from photodiode 26, which begins another cycle of photocharge collection. RESET remains high and VR goes low at time $t_9$, thus inactivating source follower FET 23 and allowing FET 23 of other pixel rows to put signals on column bus $15_j$. This is illustrated by waveform portions $35_{i+1}$ and $36_{i+1}$ representing the respective waveforms applied to the next row $R_{i+1}$, and waveform portion 38 of the $V_{REF,IDEAL}$ signal.

If a pinned photodiode is used for the photosensitive element, the photocharge collected in the pinned photodiode can be completely transferred to reference node 25 without charge sharing. In the pinned photodiode case, the photodiode reset period is not necessary because the signal read results in complete charge transfer and the photodiode is reset as it is read.

Figure 6:
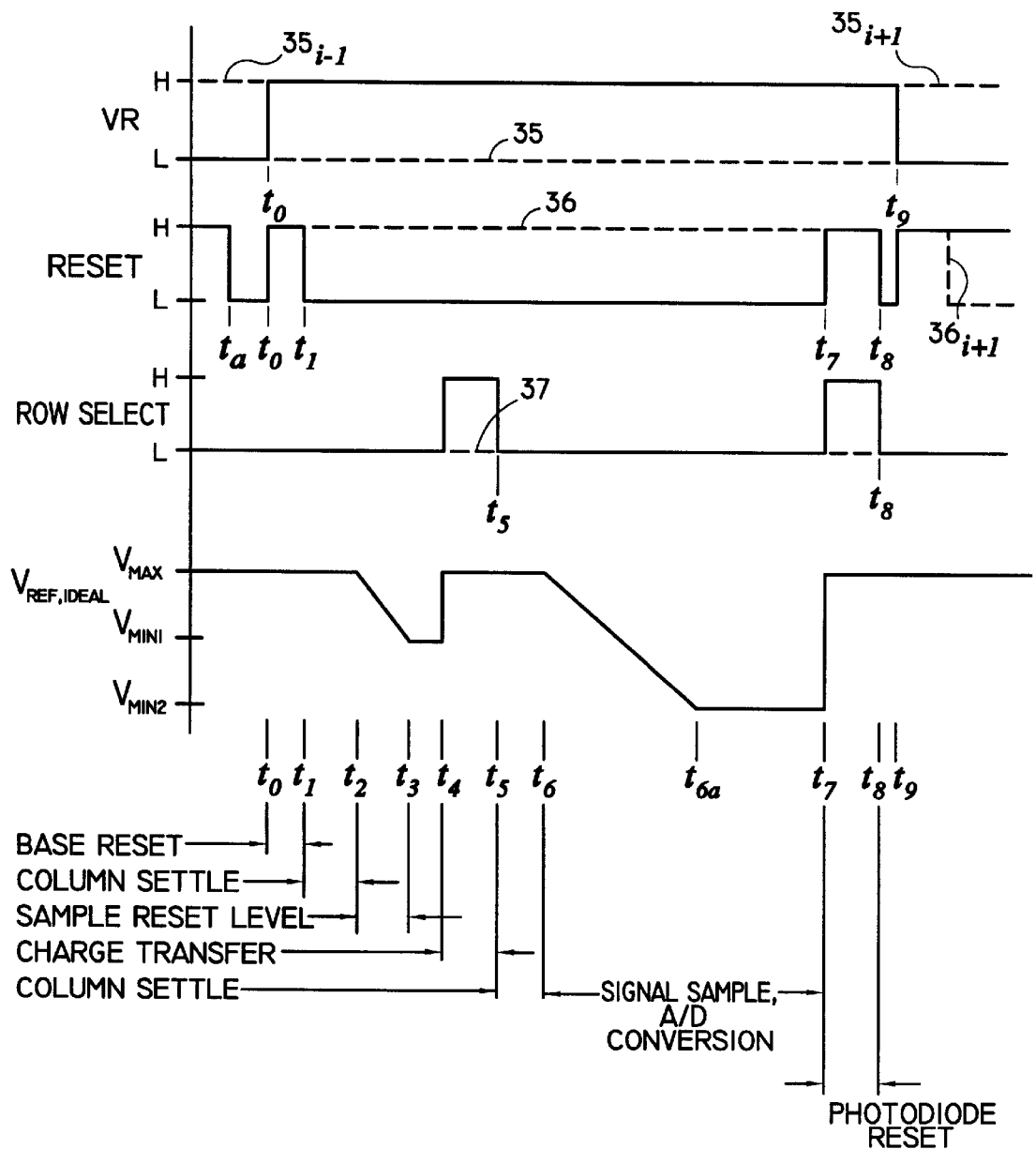

FIG. 6 illustrates a timing diagram of alternative waveforms for the RESET and ROW SELECT signals. Image sensor 20 can operate with either one or both of these waveforms applied as alternatives to those presented in FIG. 5. Referring first to the alternate RESET waveform, prior to onset of the reset period at time $t_0$, the RESET signal is brought low at time $t_a$ before raising VR. This approach reduces feedthrough from the RES line to the reference node 25 due to the gate to source capacitance of reset FET 21. In addition, after the photodiode reset period, the RESET signal is brought low at time $t_8$ before VR goes low at time $t_9$. After VR goes low, the RESET signal has to be brought high again to hold reference node 25 to the low potential at VR so as to isolate the readout FET 23 from the column bus 15 and allowing the readout FETs of other pixel rows to put signals on the column bus.

Referring now to the alternate ROW SELECT waveform of FIG. 6, after ROW SELECT is brought high at time $t_4$ to transfer the photocharge to reference node 25, ROW SELECT is brought low at time t5 before the second column settle interval ($t_5$–$t_6$). ROW SELECT then remains low during the second sampling interval. This technique allows the clock coupling due to the row select FET 22 to be canceled before signal read. Such clock coupling would otherwise be present due to the parasitic gate to source capacitance of FET 22. The ROW SELECT signal is then brought high again during the photodiode reset period to allow the photodiode to be reset through FET 22 and FET 21.

Figure 7:
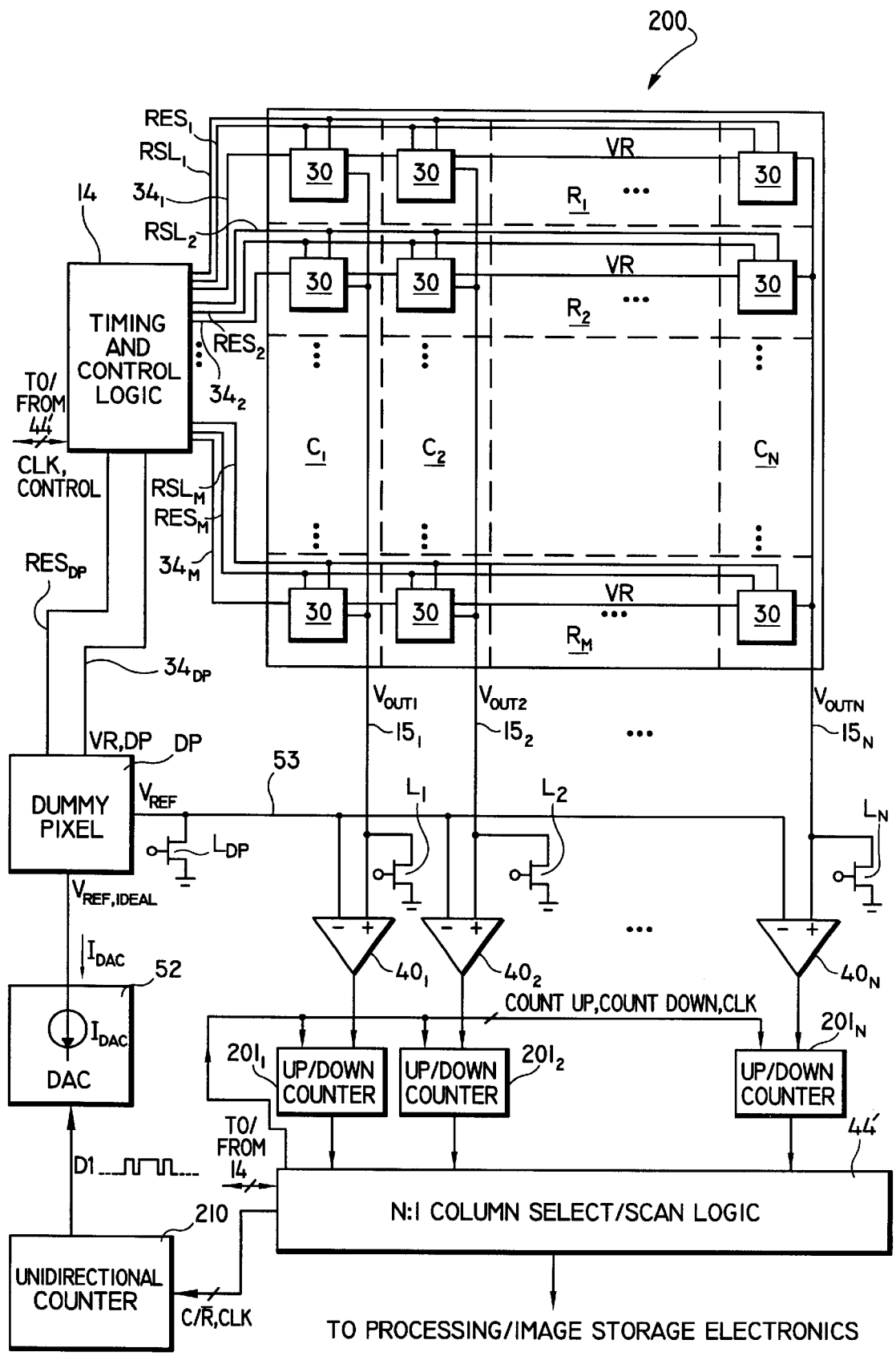
FIG. 7 schematically illustrates an alternative embodiment of the present invention employing up/down counters for correlated double sampling.

With reference now to FIG. 7, another embodiment of the present invention, image sensor 200, is schematically illustrated. Image sensor 200 is essentially the same as image sensor 20 of FIG. 2 discussed above, except that the registers $42_1$–$42_N$ have been replaced by up/down counters $201_1$–$201_N$, respectively. Unidirectional counter 210 is basically the same or similar to digital code generator/controller 50 of FIG. 2. The technique of using an up/down counter in a correlated double sampling operation, and in particular, with a CMOS image sensor, is described in detail in co-pending U.S. patent application entitled CORRELATED DOUBLE SAMPLING WITH UP/DOWN COUNTER, mentioned above and incorporated by reference. Employing an up/down counter in a CDS operation is advantageous in that the subtraction of the reset sample from the signal sample is performed automatically without the need to separately store both samples in a register and transfer them out separately. Also, the processing circuitry is relieved from the task of performing the subtraction.

Image sensor 200 combines the advantage of threshold voltage compensation with that of automatic CDS subtraction by the up/down counters. In operation, the waveforms of FIG. 5 or 6 are essentially the same as described above. Briefly, referring to FIG. 5, after the base reset and column settle intervals for the active row (times $t_0$–$t_2$) the reset level is sampled by means of unidirectional counter 210 starting to count at time $t_2$. Counting is initiated by means of timing and logic block 44' applying a logic high, COUNT/RESET (C/R) signal to counter 210 at time $t_2$. Also at time $t_2$, each up/down counter $201_1$–$201_N$ starts counting down from a predetermined reference count (e.g., all zeroes) under the command of a COUNT DOWN signal provided by logic block 44'. As unidirectional counter 210 counts, DAC 52 converts the output count to $I_{DAC}$, thus producing $V_{REF,IDEAL}$ whereby dummy pixel DP produces VREF including the effect of threshold voltage, in the same manner as described above. Thus, $V_{REF,IDEAL}$ is ramped down from $V_{MAX}$ to $V_{MIN1}$ as in the case above. During the reset sampling interval $t_2$–$t_3$, as soon as $V_{OUTj}$ of column $C_j$ exceeds $V_{REF}$, the logic level output of the associated comparator $40_j$ flips state, thereby commanding up/down counter $40_j$ to stop counting. As such, the stopped count corresponds to the reset level for the active pixel in that column with the source follower threshold voltage mismatch compensated for.

The unidirectional counter is reset to zero at time $t_3$ or shortly thereafter (e.g., at time $t_4$ in FIG. 5) whereas each up/down counter $201_1$–$201_N$ is not reset and remains latched at the last count. Following the charge transfer and column settle intervals (times $t_4$–$t_6$) the signal sampling interval commences at time $t_6$ by causing counter 210 to begin counting again via application of a C/R pulse by logic block 44'. Also, at time $t_6$, logic block 44' flips the logic state of a COUNT DOWN signal applied to each up/down counter $201_1$–$201_N$ to command each counter to commence counting upward from the previous count obtained in the reset sampling interval. Then, during the signal sampling interval, as soon as $V_{OUTj}$ exceeds $V_{REF}$, the logic level output of comparator $40_j$ flips state again, commanding the associated up/down counter $201_j$ to stop counting. At this point, the count of up/down counter $201_j$ corresponds to the signal level minus the reset level for the active pixel in column $C_j$ and the correlated double sampling operation is complete, with the threshold voltage nonlinearity of the source follower FET compensated for. The output counts for all the up/down counters are then transferred to logic block 44' following the signal sampling interval, whereupon all up/down counters and unidirectional counter 210 are reset to permit image data readout from the subsequent row.

Figure 8:
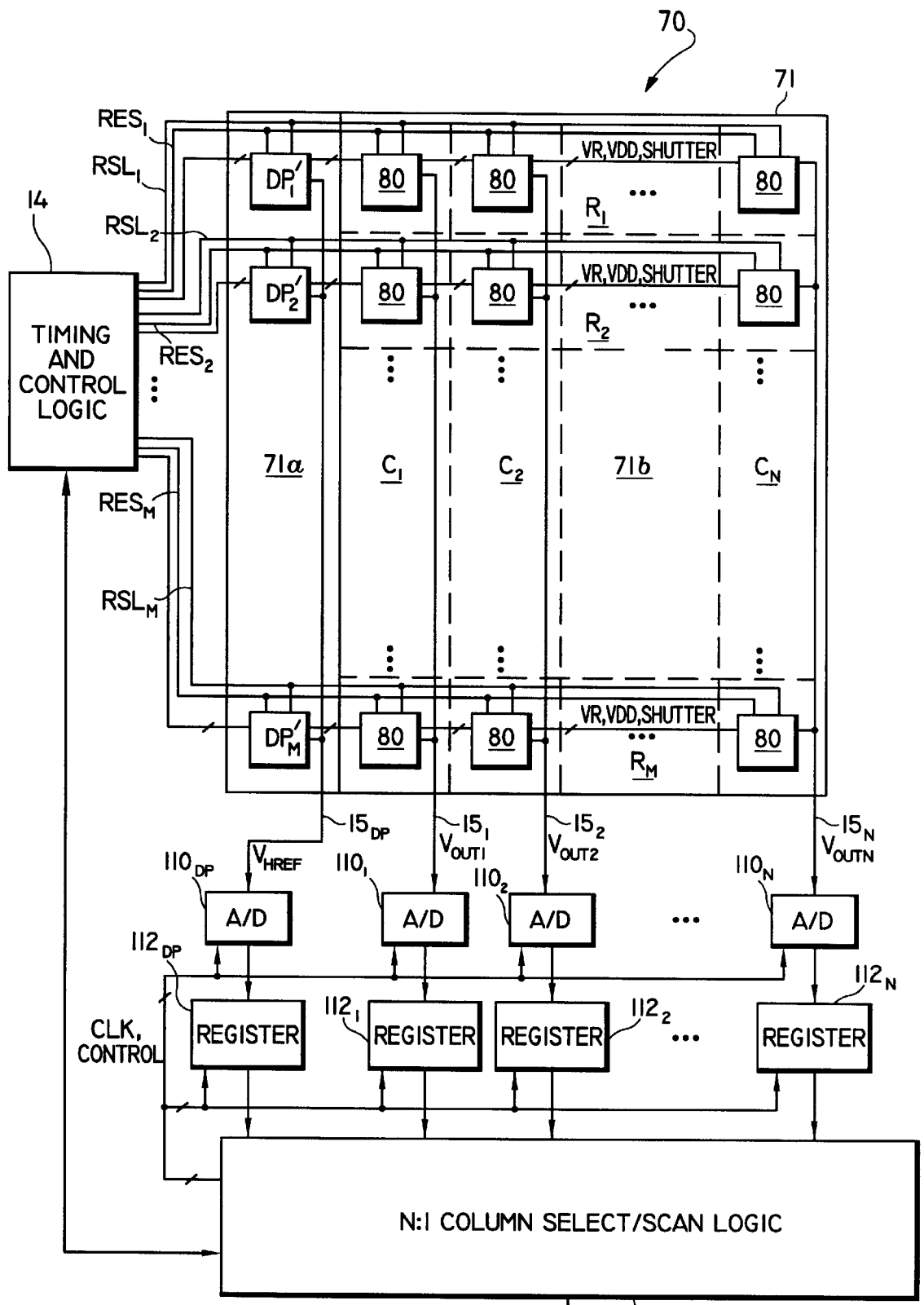
FIG. 8 schematically illustrates another embodiment of the present invention with electronic shuttering capability.

FIG. 8 schematically illustrates another embodiment of the present invention, image sensor 70, which includes electronic shuttering capability. Image sensor 70 employs an array of dummy pixels DP1'–DPM' to compensate for leakage current within pixels 80 of the main array. Such leakage current is common when an electronic shutter transistor is used within the pixels. Since image data is read out sequentially row by row, e.g., top to bottom, the pixels in the bottom rows exhibit more leakage current than those in the top rows. The dummy pixel array compensates for this disparity, thus improving the overall image quality. The dummy pixel array 71a may be physically located adjacent the first column $C_1$ of the main array 71b as shown (or alternatively, adjacent the last column $C_N$) to form a M×(N+1) pixel array 71. This configuration facilitates connection to the same bus lines such as $RES_1$–$RES_N$ that connect to pixels 80. In the embodiment of FIG. 8, A/D converters $110_{DP}$ and $110_1$–$110_N$ connect to respective column data lines $15_{DP}$ and $15_1$–$15_N$ to directly digitize the reset and signal data outputs on the column data lines. Registers $112_{DP}$ and $112_1$–$112_N$ temporarily store the digitized samples for subsequent transfer to registers in logic block 44 for subsequent processing.

Figure 9:
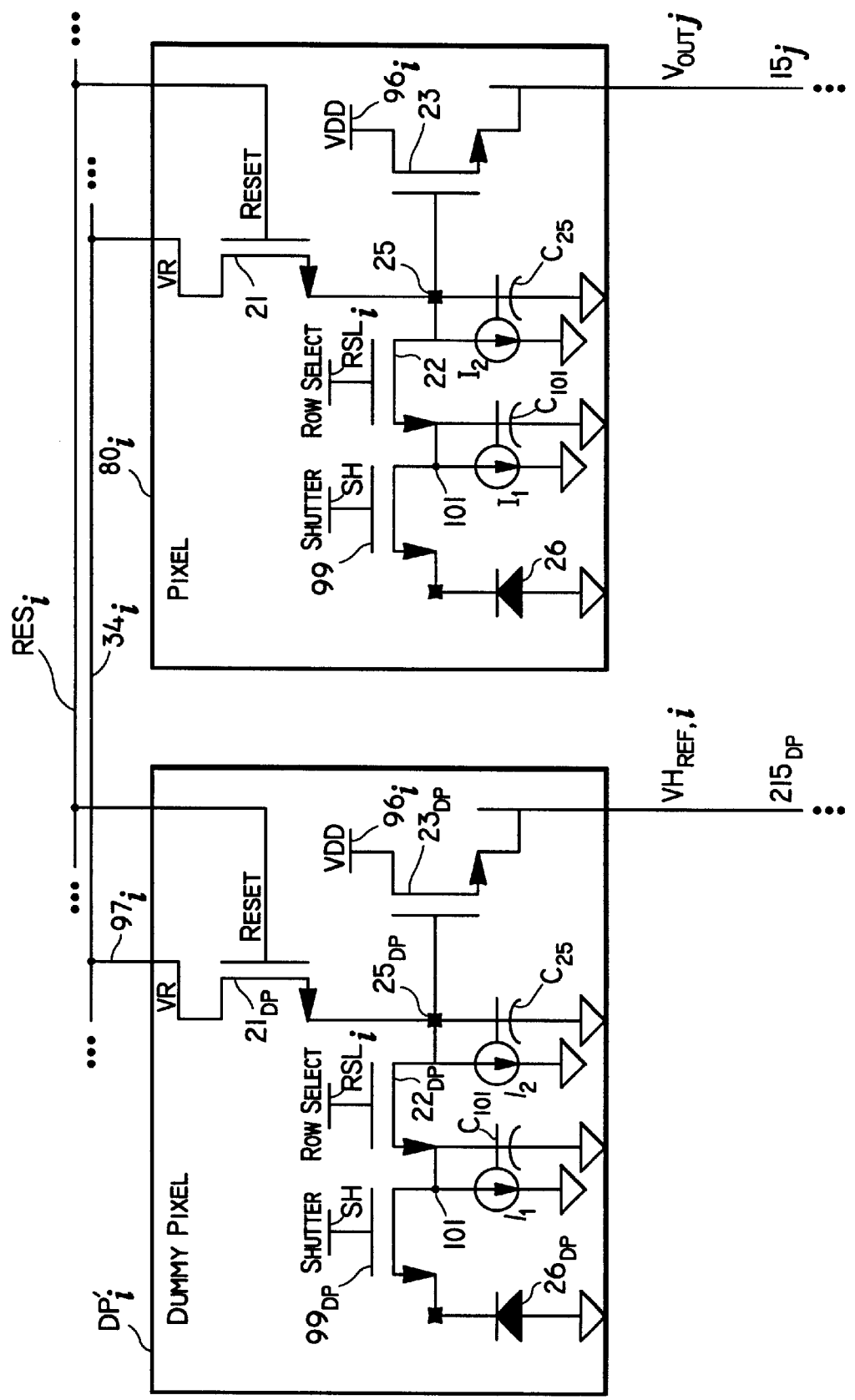
FIG. 9 illustrates pixel circuitry that may be used within the pixels of the image sensor of FIG. 8.

Referring to FIG. 9 in conjunction with FIG. 8, an exemplary pixel $80_i$ and dummy pixel DPi in a common row Ri are shown. Pixel $80_i$ differs from pixel 30 of FIG. 3 in that a shutter transistor 99 has been added between the charge transfer device 22 and the photodiode 26 to perform an electronic shuttering function. The shutter function enables a "still" image to be taken whenever an external switch is activated, similar to a mechanical shutter in a camera. For motion picture applications, e.g., camcorders, the shutter function allows for versatility in the shutter speed whereby higher quality video is achievable for fast moving subjects. The circuitry of dummy pixel $DP_i$ is identical to that of pixel $80_i$, except that the photodiode $26_{DP}$ is shielded against light such that no photocharge is developed due to light. As such, dummy pixel $DP_i$ functions solely to generate an output signal $VH_{REF,i}$ whose value is related to the amount of leakage current within the dummy pixel. This output signal is used as a reference to compensate for leakage current in pixels $80_i$ of the same row. A SHUTTER signal is applied on a common bus line SH connected to the gates of all devices 99 in the entire M×N array 71b. The SHUTTER signal is also simultaneously applied to each device $99_{DP}$ of all the dummy pixels. After a manual or electronic shutter switch (not shown) is activated, the SHUTTER signal is pulsed high a first time to reset the photodiode. Then, after a predetermined time interval, the SHUTTER signal is pulsed again to transfer the photocharge collected to a storage node 101 at the drain of the shutter transistor 99. Storage node 101 stores voltage on capacitance C101 corresponding to the light intensity on the pixel 80i. This voltage is stored until the row select transistor 22 is pulsed to read out the image data. While the charge is being stored at storage node 101, leakage currents I1 and I2 flow to ground, thus reducing the potential at the storage node. Without the dummy pixel array to compensate for this leakage current, the total charge lost by leakage current is significant, whereby the overall picture quality would be degraded.

Figure 10A:
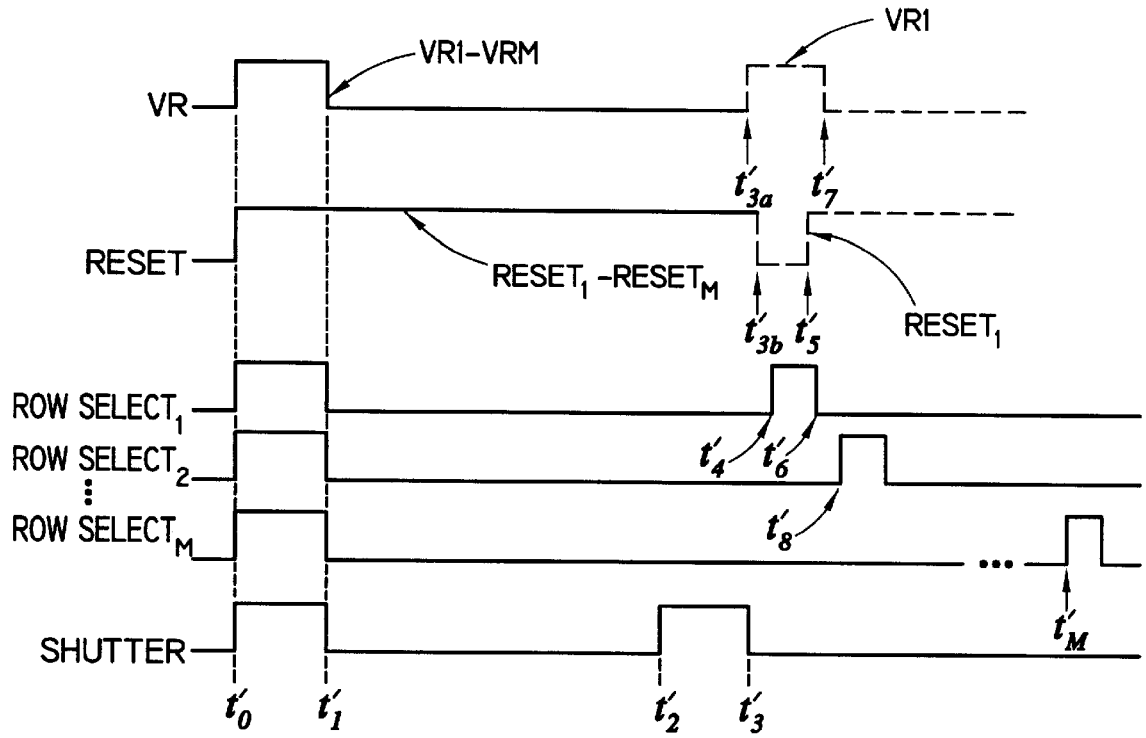
FIGS. 10A–10C are timing diagrams for the image sensor of FIG. 8.
Figure 10B:
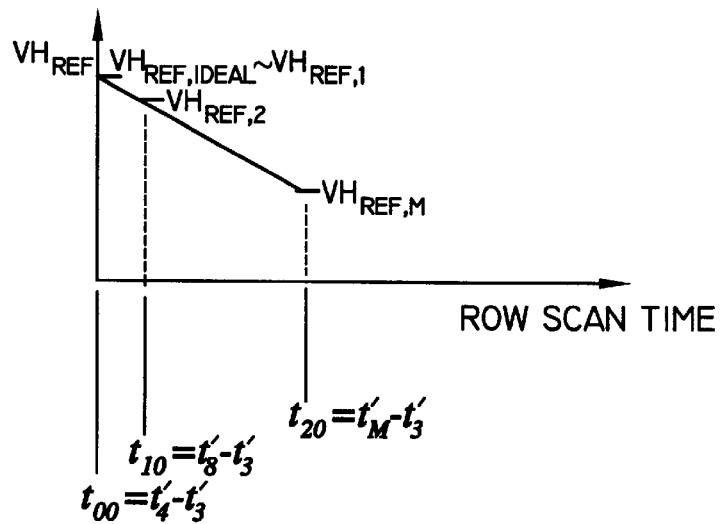
Figure 10C:
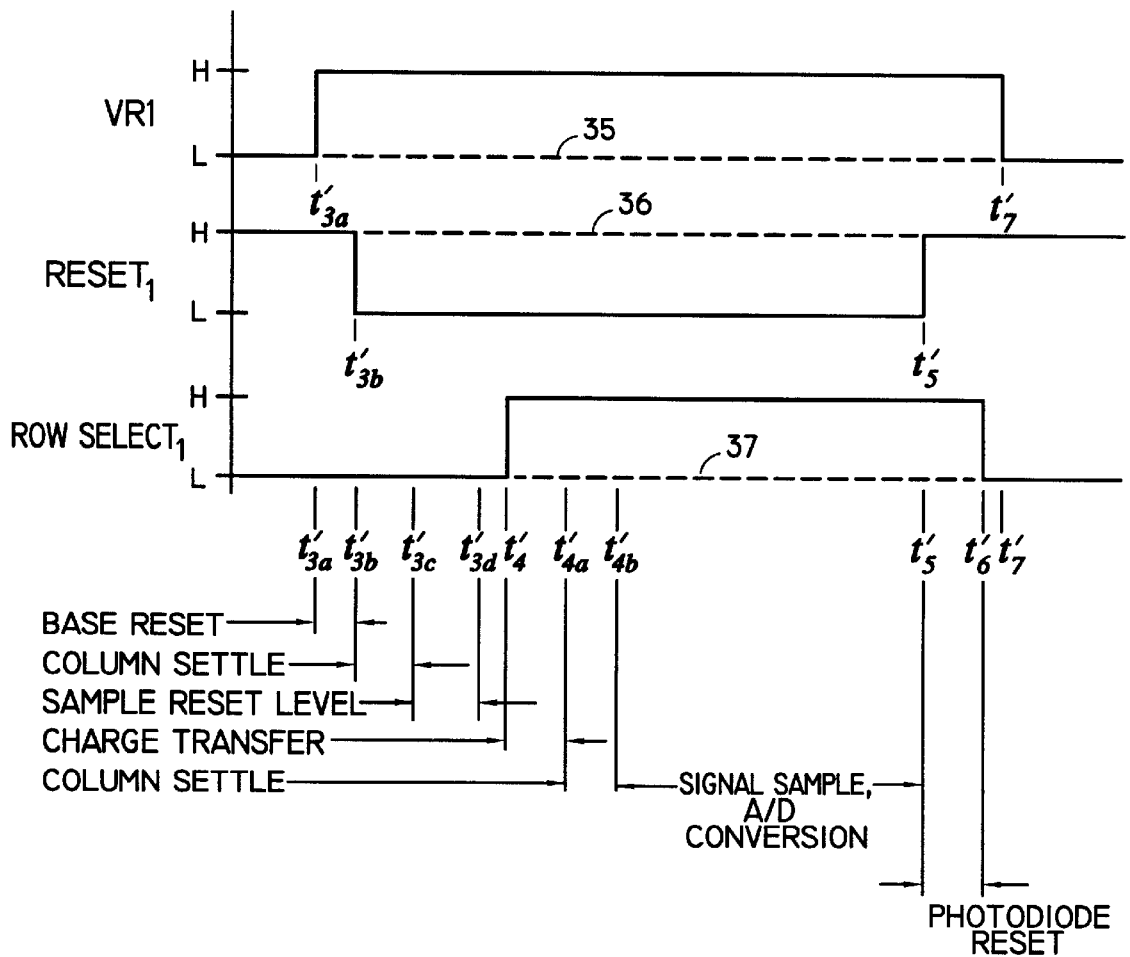

Operation of image sensor 70 will now be explained further with reference to the timing diagrams of FIGS. 10A–10C. When a manual or electronic shutter switch (not shown) is depressed, all the photodiodes are reset between time $t_0'$ and $t_1'$. This is accomplished by raising, at $t_0'$, the SHUTTER signal as well as all the ROW SELECT signals, ROW $SELECT_1$–ROW $SELECT_M$, all VR signals VR1–VRM and all RESET signals $RESET_1$–$RESET_M$ all rows $R_1$–$R_M$, respectively. Photocharge is then collected between times $t_1'$ to $t_2'$ to capture an image of the subject (still image or image frame of a moving picture). At time $t_2'$, SHUTTER is pulsed again, thereby transferring the collected photocharge to storage node 101 of each pixel 80. This transferred photocharge lowers the potential of storage node 101, which was previously at some reference voltage level due to capacitance $C_{101}$. In the dummy pixels, the storage node 101 essentially remains at that reference level since the photodiodes $26_{DP}$ are shielded from light. At time $t_3'$, SHUTTER is brought low again, isolating the photodiode 26 from storage node 101. Sequential row by row readout of the image data then begins. At time $t_{3a}'$, the VR pulse applied to row R1 (VR1) is raised, which is followed by $RESET_1$ going low at time $t_{3b}'$ and ROW $SELECT_1$ going low at time $t_4'$. As shown more clearly in FIG. 10C, a base reset occurs between times $t_{3a}'$–$t_{3b}'$. Following a column settle interval between times $t_{3b}'$–$t_{3c}'$, the reset level is sampled between times $t_{3c}'$–$t_{3d}'$ by the A/D converters $110_{DP}$ and $110_1$–$110_N$. Each A/D converter such as $110_j$ provides a digital output code representing the voltage $V_{OUTj}$ (hereafter, $V_{OUTj,RES}$). This output code is used as the reset sample for a correlated double sampling operation. The digital output is stored in register $112_j$ for subsequent transfer to logic block 44. A/D converter $110_{DP}$ digitizes the dummy pixel reset level $VH_{REF,RESi}$ for the active row $R_i$ and subsequently transfers the digital code to register $112_{DP}$ for ensuing transfer to logic block 44.

Next, ROW $SELECT_1$ is brought high at time $t_4'$ to transfer the potential of storage node 101 to reference node 25 in the pixels 80 of row $R_1$. As such, the reference node 25 potential is lowered in correspondence with both the amount of light incident upon the pixel and the voltage drop at storage node 101 due to leakage current that occurred since time $t_3'$. The potential of the dummy pixel $DP_1$' storage node $101_{DP}$ is likewise transferred to reference node $25_{DP}$. In the dummy pixel, the potential at reference node $25_{DP}$ is lowered in accordance with the voltage drop due to the current leakage since time $t_3'$. Following a column settle interval between $t_{4a}'$–$t_{4b}'$, the output signal $V_{OUT}$ on each column bus is sampled again, and each A/D converter such as $110_j$ provides a second digital output code corresponding to the signal level for the active pixel in row $R_i$, i.e., $V_{OUTj,SIG}$. Likewise, A/D converter $110_{DP}$ provides a digital output code representing $V_{HREF,SIGi}$, during the signal sample interval. After the digital codes are transferred to logic block 44, the CDS operation is completed via simple arithmetic operation with leakage current compensated for. The image datum $IM_{ij}$ for the pixel in row $R_i$ and column $C_j$ is computed as:

$$IM_{ij}=(V_{OUTj,SIG}-V_{OUTj,RES})-(VH_{REF,SIGi}-VH_{REF,RESi}) \quad (1)$$

where ($VH_{REF,SIGi}$–$VH_{REF,RESi}$) represents the leakage current component of each image datum in row $R_i$. Accordingly, the correlated double sampled image datum for each active pixel has the leakage current component extracted out.

Following signal sample, $RESET_1$ is brought high at time $t_1'$, ROW $SELECT_1$ is brought low at time $t_6'$, and VR1 is brought low at time $t_7'$. Referring again to FIG. 10A, the image data of the next row $R_2$ is then read out beginning at time $t_8'$ in the same manner as described above for row $R_1$. Sequential row by row readout continues to the last row $R_M$. Since the image data for each row is read out at a different time, the voltage drop in the image data due to leakage current is different for each row. This is illustrated in FIG. 10B, where is it seen that the dummy pixel output voltage $VH_{REF}$ (i.e., $VH_{REF,SIG}$) on column line $15_{DP}$ diminishes with row scan time. $VH_{REF,1}$ is approximately the ideal value, $VH_{REF,IDEAL}$ at row scan time $t_{00}=t_4'$–$t_3'$. This drops to $VH_{REF,2}$ at row scan time $t_{10}=t_8'$–$t_3'$ and eventually to $VH_{REF,M}$ at row scan time $t_{20}=t_M't_3'$. However, the drop in $VH_{REF}$ on column bus $15_{DP}$ at any given time is essentially the same voltage drop that occurs within the pixels of the activated row due to leakage current. Therefore, the change in image data due to leakage current is canceled by the subtraction operation in accordance with eqn. (1), which occurs in logic block 44 or the image processing circuitry.

Figure 11:
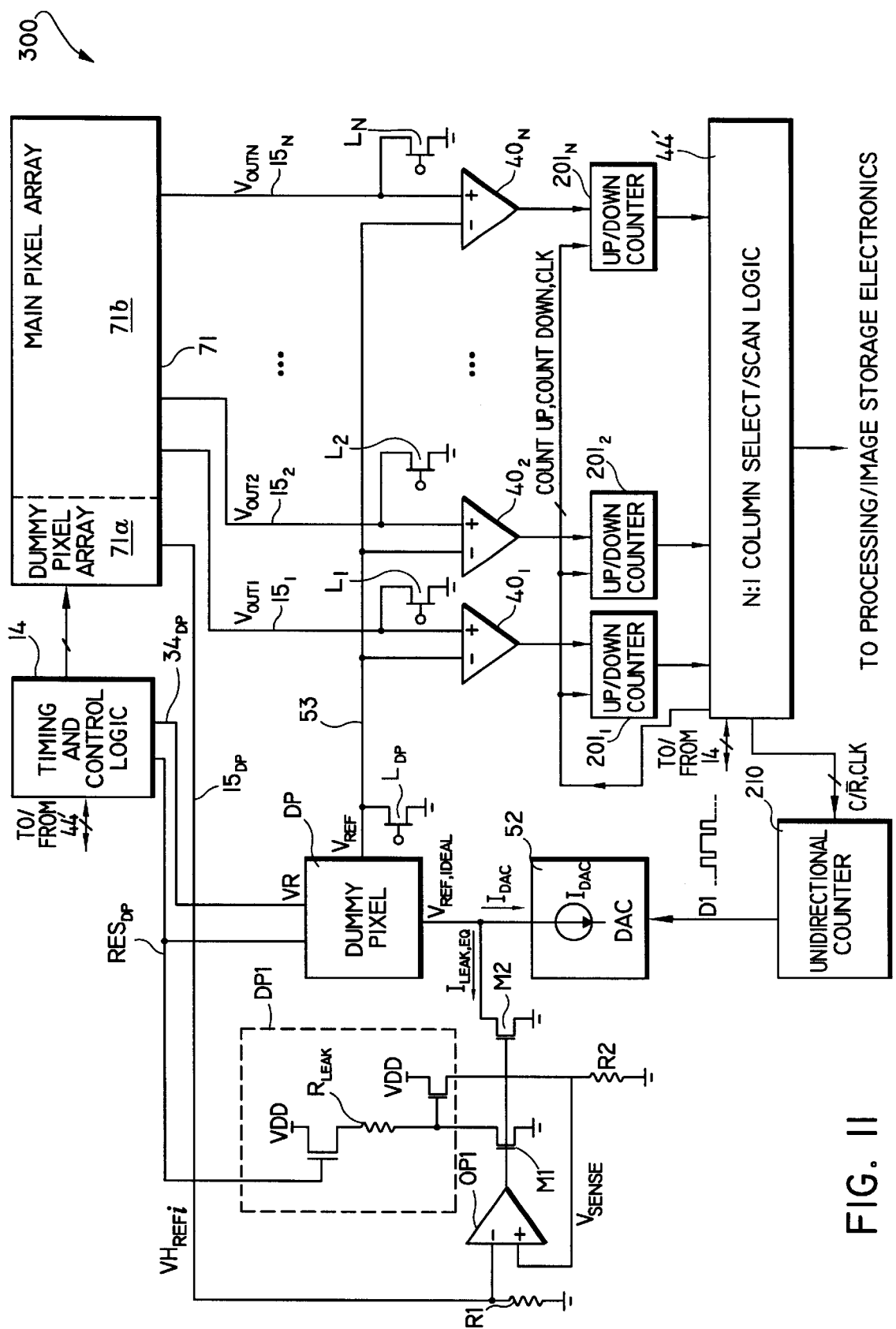
FIG. 11 illustrates another embodiment of the present invention which compensates for leakage current as well as threshold voltage nonlinearities.

Turning now to FIG. 11, yet another embodiment of the present invention, image sensor 300, is schematically illustrated. This embodiment includes the above-described dummy pixel array 71a to compensate for leakage current, in conjunction with the dummy pixel DP to compensate for threshold voltage nonlinearity. In addition, comparators $40_1$–$40_N$ and up/down counters $201_1$–$201_N$ are used to facilitate correlated double sampling as discussed above.

Figure 12:
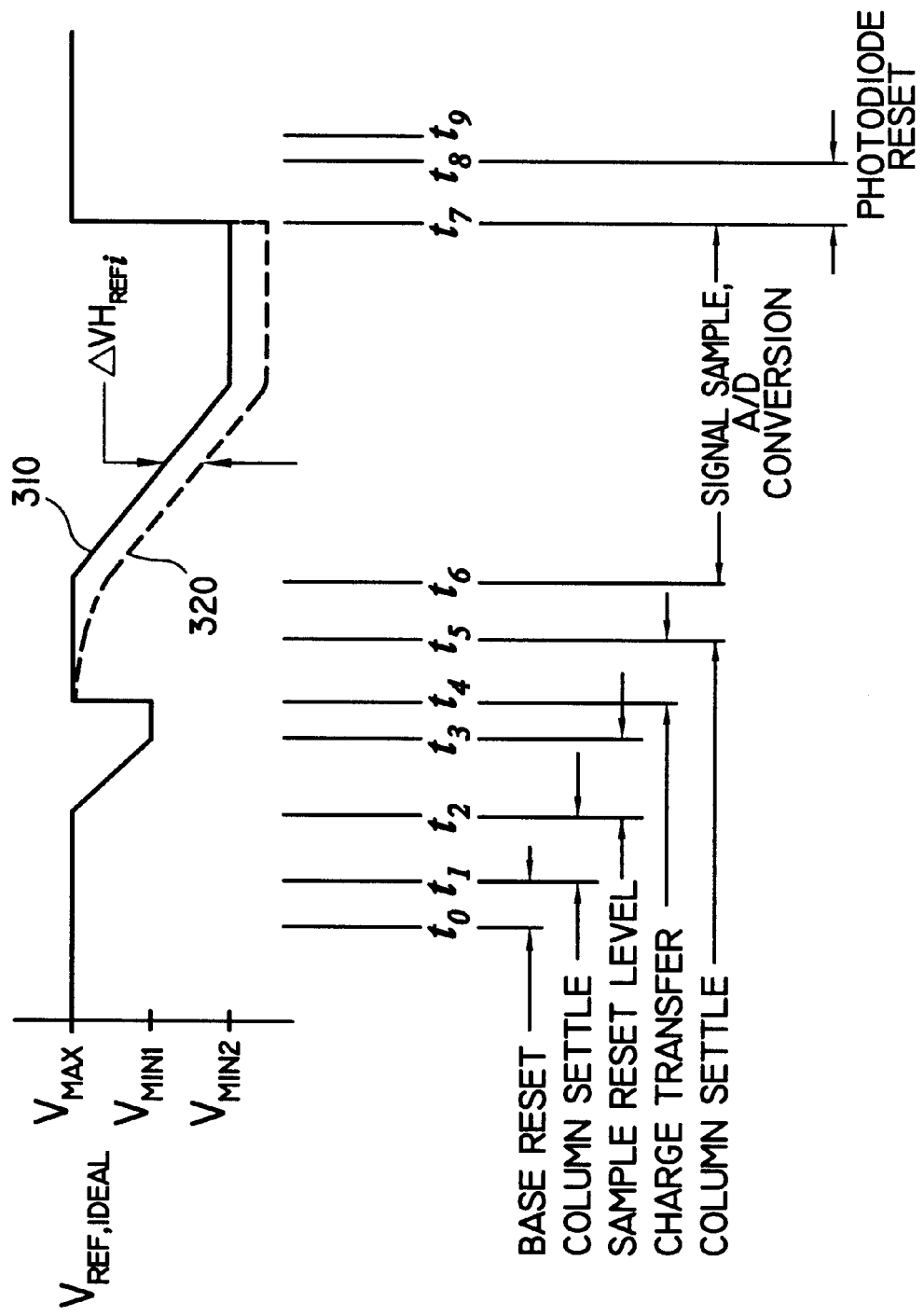
FIG. 12 shows a comparison or reference voltage waveforms with an without leakage current compensation.

In operation, unidirectional counter 210 counts up or down in both the reset and signal sample intervals, as described above, whereby the current $I_{DAC}$ is produced in accordance with the count. This current produces the voltage $V_{REF,IDEAL}$ at the reference node $25_{DP}$ of dummy pixel DP. Without leakage current compensation, $V_{REF,IDEAL}$ would be generated as the same waveform for every row $R_1$–$R_M$. The leakage current compensation circuitry modifies the voltage $V_{REF,IDEAL}$ by means of current $I_{LEAK,EQ}$ which is caused to flow in parallel with $I_{DAC}$. The current $I_{LEAK,EQ}$ results in $V_{REF,IDEAL}$ being lowered by an amount $\Delta VH_{REFi}$, as shown in FIG. 12, where $\Delta VH_{REFi}$ is proportional to the amount of leakage current in the pixels of row $R_i$. Thus, $\Delta VH_{REFi}$ is minimal for row $R_1$ and the largest for row $R_M$. In FIG. 12, waveform 310 represents $V_{REF,IDEAL}$ without leakage current compensation, and waveform 320 is $V_{REF,IDEAL}$ with exemplary leakage current compensation. The two waveforms are substantially the same during the reset sample interval since the reference (readout) nodes 25 and $25_{DP}$ in the main and dummy pixel arrays, respectively, were just reset. The leakage current only affects the reference node potential after the row select transistor transfers the charge towards it (following the charge transfer interval).

With continuing reference to FIG. 11, $I_{LEAK,EQ}$ may be generated using the voltage to current conversion circuitry consisting of operational amplifier OP1, transistors M1 and M2, resistors R1 and R2 and dummy pixel DP1 which may be the same as dummy pixel DP. Only a single dummy pixel DP and a single dummy pixel DP1 are needed for the entire image sensor. Dummy pixel DP operates as was described above in reference to FIG. 2. Op amp OP1 has its negative input terminal connected to line $15_{DP}$ to receive $VH_{REFi}$. The positive input is connected in a negative feedback loop so as to buffer the voltage $VH_{REFi}$, whereby an output voltage $V_{SENSE}$ is maintained at the same level as $VH_{REFi}$. The output of OP1 is connected to the gate of current source transistor M1. The load resistor of M1 is $R_{LEAK}$, which has the same resistance as resistor 19 in dummy pixel DP. Since $V_{SENSE}$ is the same as $VH_{REFi}$, the current through $R_{LEAK}$ is an amount which can produce the same voltage drop as occurs at the reference (readout) node in the leakage dummy pixel DPi'. The current in M1 is replicated in M2 and the current $I_{LEAK,EQ}$ flows in parallel with $I_{DAC}$ to generate the shifted reference voltage as shown in FIG. 12.

For applications in which it is only necessary or desirable to compensate for leakage current without compensating for threshold voltage nonlinearity, the image sensor of FIG. 11 can be easily modified for use in conjunction with the up/down counters and comparators without the dummy pixels DP and DP1. This can be implemented by replacing the current type DAC 52 with a voltage type DAC, connecting the analog output of the voltage type DAC directly to line 53 and applying the output of op amp OP1 to the voltage type DAC. The op amp output would be used as a reference voltage which modifies the DAC analog output in correspondence with the leakage current.

While the above description contains many specifics, these specifics should not be construed as limitations on the scope of the invention, but merely as exemplifications of preferred embodiments thereof. For example, other pixel configurations can be utilized as alternatives to those disclosed herein. Further, the timing and logic circuitry may employ bipolar devices in BiCMOS technology as an alternative to using strictly FETS in CMOS technology. Those skilled in the art will envision many other possible variations that are within the scope and spirit of the invention as defined by the claims appended hereto.

What is claimed is:

1. An image sensor, comprising:

a plurality of imager cells arranged in rows and columns, with the imager cells of a particular column being coupled to a column data line of that column, and each imager cell being operable to selectively provide an output signal indicative of one of an amount of light incident upon that imager cell and an amount of noise due to non-ideal characteristics of said each imager cell;

at least one dummy pixel having a source follower field effect transistor and characteristics which are at least similar to characteristics of said each imager cell, said dummy pixel providing an output reference signal; and correlated double sampling circuitry for performing a noise sampling and a signal sampling with respect to said output signal from said each imager cell in association with said output reference signal from said dummy pixel, and image data corresponding to said each imager cell being obtained from said noise sampling and signal sampling, wherein said correlated double sampling circuitry comprises a plurality of comparators, each having a first input terminal coupled to one of said column data lines and a second input terminal connected to receive said output reference signal, and wherein said reference signal is a time varying reference signal and further comprising a plurality of up/down counters, each coupled to an output of one of said comparators and operable to count in a first direction during a first sampling interval and in an opposite direction during a second sampling interval, each up/down counter being responsive to an output of the associated comparator to stop counting when the amplitude of the time varying reference signal substantially equals the amplitude of a reset level in the first sampling interval and a signal level in the second sampling interval to thereby complete a correlated double sampling operation.

2. The image sensor of claim 1, wherein said dummy pixel characteristics are substantially identical to characteristics of each imager cell.

3. The image sensor of claim 1, further comprising a plurality of registers, each coupled to an output of one of said comparators, for temporarily storing a first digital code corresponding to a reset level and a second digital code corresponding to a signal level of an activated pixel, each said register being latched by a predetermined output level of the associated comparator, each register subsequently transferring each of said first digital codes to subtraction circuitry for subtracting each of said first digital codes from a corresponding second digital code.

4. The image sensor of claim 1, wherein said reference signal is a time varying reference signal and further including means for ramping said time varying reference signal from a maximum level to a first minimum level during a first sampling interval, and from said maximum level to a second minimum level lower than said first minimum level during a second sampling interval in connection with a correlated double sampling operation.

5. The image sensor of claim 1, wherein:

each imager cell includes a photosensitive element for providing a photocharge responsive to incident light, circuit means for selectively transferring the photocharge to a reference node within the imager cell, and a reset switch operable to selectively switch a low supply voltage to the reference node to isolate the reference node from the associated column data line.

6. The image sensor of claim 1, including complementary metal oxide semiconductor (CMOS) circuitry for providing timing and control signals to the imager cells.

7. The image sensor of claim 1, wherein each imager cell comprises:

a photosensitive element providing a photocharge responsive to incoming light;

a first transistor coupled to a row select line carrying a row select signal to imager cells of a common row to selectively activate the imager cells of the common row for image data readout, said first transistor operable to transfer said photocharge towards a reference circuit node within said imager cell responsive to said row select signal;

a second transistor operably coupled to said first transistor, said second transistor operative to selectively set a voltage level at said reference node; and a third transistor having a control terminal coupled to said reference node, and an output terminal coupled to the column data line of the column associated with the particular imager cell, said third transistor providing a first output indicative of a reset potential of said reference node during a first sampling interval in which said first and second transistors are both off, and a signal output indicative of potential of said reference node during a second sampling interval.

8. The image sensor of claim 1, wherein said non-ideal characteristics include leakage current within each imager cell, each imager cell includes a shutter transistor to perform an electronic shuttering function, and said at least one dummy pixel comprises an array of dummy pixels coupled to a common output data line, each dummy pixel selectively providing an output signal on said common data line related to leakage current therein and also related to leakage current within associated ones of said pixels, said output signals on said common data line being used to reduce errors in said image data due to leakage current.

9. The image sensor of claim 8, wherein said array of dummy pixels comprises a column of dummy pixels disposed adjacent to said columns of imager cells and connected to common supply voltage lines as said imager cells.

10. An image sensor comprising:

a plurality of imager cells arranged in rows and columns, with the imager cells within any given column being coupled to a column data line of that column, and each imager cell having a source follower transistor, said imager cell operable to selectively provide a first output during a first sampling interval indicative of a reset level and a second output during a second sampling interval indicative of an amount of light incident upon that imager cell;

a plurality of dummy imager cells operative to compensate for leakage current due to non-ideal characteristics of each imager cell within said imager cells;

at least one dummy pixel having a source follower transistor, said dummy pixel operative to compensate for threshold voltage variation due to non-ideal characteristics of each imager cell occurring within said source follower transistor of each of said imager cells; and correlated double sampling circuitry coupled to said column data lines for providing correlated double sampled image data with said leakage current and threshold voltage variation compensated for, wherein said non-ideal characteristics include nonlinear voltage transfer characteristics of said source follower transistor within each imager cell, wherein said dummy pixel comprises a source follower field effect transistor, a resistor connected to a gate of said transistor and a further transistor having a first conducting terminal coupled to said resistor, a second conducting terminal coupled to receive a supply voltage and a control terminal coupled to receive a control voltage, wherein the connection between said resistor and said gate terminal define a reference circuit node having a potential that is caused to vary during said first and second sampling intervals.

11. The image sensor of claim 10 wherein:

said plurality of dummy imager cells are arranged in an array, each dummy imager cell is connected to a common output data line and providing an output indicative of leakage current of imager cells in an associated row on said output data line when the associated row of imager cells is activated;

said image sensor further comprising a unidirectional counter and a digital to analog (D/A) converter coupled to said counter and to said dummy pixel, said counter operative to count during each of said first and second sampling intervals and said D/A converter providing a ramped reference signal output during each sampling interval;

said image sensor comprising circuitry operatively coupled to said output data line and to said D/A converter for modifying said ramped reference signal in accordance with said output indicative of leakage current; and said dummy pixel providing a dummy pixel output related to said modified ramped reference signal, said dummy pixel output including compensation for threshold voltage variation and being provided to said correlated double sampling circuitry.

* * * * *